E. A. HALBLEIB & F. F. DORSEY.
ELECTRIC STARTING AND GENERATING APPARATUS.
APPLICATION FILED MAY 15, 1915. RENEWED JAN. 9, 1917.
1,220,101.
Patented Mar. 20, 1917.
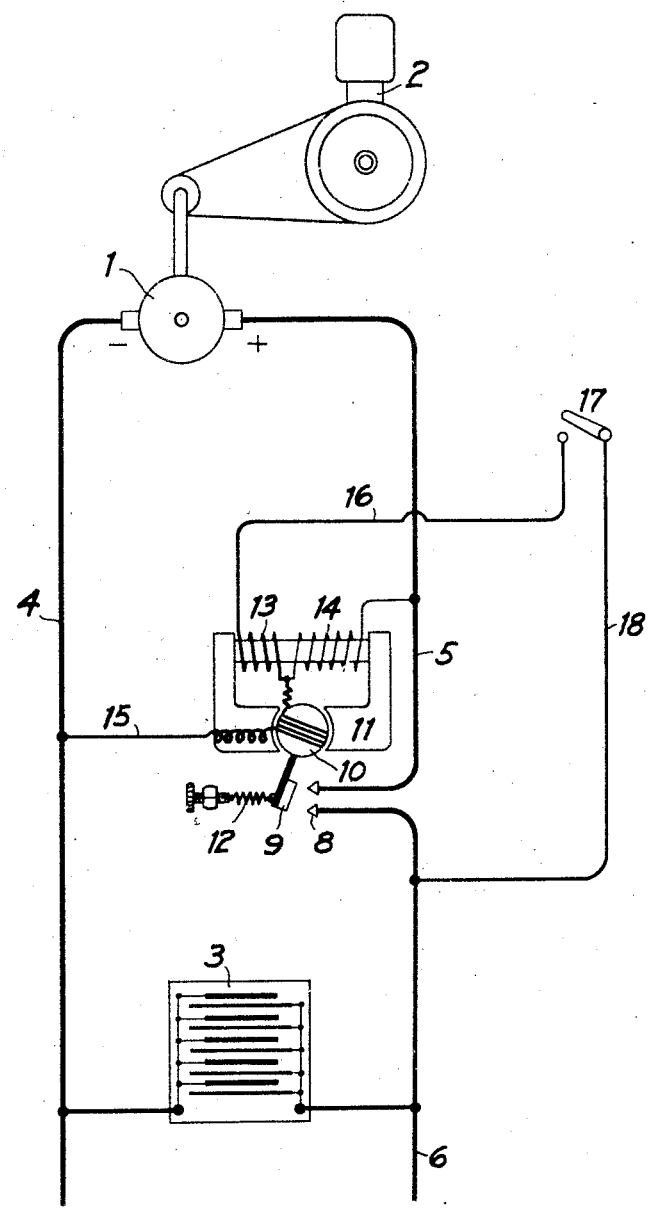
Inventors:
Edward A. Halbleib
Farnum F. Dorsey
by their attorneys
Davis & Dorsey

UNITED STATES PATENT OFFICE.

EDWARD A. HALBLEIB, OF ROCHESTER, NEW YORK, AND FARNUM F. DORSEY, OF WINCHESTER, MASSACHUSETTS, ASSIGNORS TO NORTH EAST ELECTRIC COMPANY, OF ROCHESTER, NEW YORK, A CORPORATION OF NEW YORK.

ELECTRIC STARTING AND GENERATING APPARATUS.

1,220,101.     Specification of Letters Patent.     Patented Mar. 20, 1917.

Application filed May 15, 1915, Serial No. 28,446. Renewed January 9, 1917. Serial No. 141,494.

*To all whom it may concern:*

Be it known that we, EDWARD A. HALBLEIB and FARNUM F. DORSEY, citizens of the United States, residing, respectively, at Rochester, in the county of Monroe and State of New York, and Winchester, in the county of Middlesex and Commonwealth of Massachusetts, have invented certain new and useful Improvements in Electric Starting and Generating Apparatus; and we do hereby declare the following to be a full, clear, and exact description of the invention, such as will enable others skilled in the art to which it appertains to make and use the same.

This invention relates to electric apparatus, such as is employed in connection with motor-vehicles driven by internal-combustion engines, for the purpose of starting such engines by the power of an electric motor energized by a storage-battery, and for thereafter recharging the battery and generating electricity for various purposes; particularly to systems of what is usually described as the "single-unit" type, that is, in which the same dynamo-electric machine is employed alternatively as a motor for starting the engine, and as a generator driven by the engine.

The object of the invention is to simplify and improve apparatus of the type in question with respect to the means by, and the manner in which the dynamo is thrown into operation as a motor, and the connections between the battery and the dynamo are controlled while the dynamo is operating as a generator.

In an application for Letters Patent of the United States, filed May 15, 1915, on behalf of Thomas L. Lee, Serial No. 28,448 to which reference is made by permission of the inventor, an arrangement is described in which the starting-switch employed to throw the dynamo into operation as a motor, is arranged so as not to directly control the main circuit connecting the dynamo and the battery, but in which the starting-switch is arranged to close a circuit by which the magnet-winding of a relay is energized, and this relay is employed both for the purpose of controlling the main circuit for the starting operation, and for the purpose of automatically controlling the battery charging operation, the relay-magnet being energized, during the performance of this latter function, by current derived from the dynamo through connections independent of the starting-switch. The present invention relates to apparatus constructed and arranged in the same general manner as that described in the said application, but differing therefrom in details of construction and operation, and the general object of the present invention is the same as that of the said application. In the apparatus of the present invention, however, the use of resistance-devices, to compensate for the changes in the air-gap which occur in an ordinary relay, is obviated by the use of a relay of a particular form, and by the use of two independent coils in the winding of the relay-magnet, one of these coils being controlled by the starting-switch and energized only from the battery, and the other coil being connected with the main conductors so as to be energized only by the generator.

The accompanying drawing is a diagrammatic representation of an electrical apparatus embodying the present invention, associated with an internal-combustion engine.

In the drawing the dynamo-electric machine 1 is illustrated in a conventional manner, and is shown as having driving connections with an engine 2. The storage-battery 3 is connected with one terminal of the dynamo by a main conductor 4, while it is connected with the other terminal by main conductors 5 and 6, which are connected and disconnected through the operation of the relay.

The relay comprises two fixed contact-members 8, with which the conductors 5 and 6 are respectively connected, and a movable contact-member 9. This movable member is carried by an arm projecting from the armature 10 of the relay. This armature is arranged to rock between pole-pieces 11, which are connected by a magnetic core carrying a winding divided into coils 13 and 14. A spring 12, connected with the armature, tends to rock it and hold it in the position shown in the drawing, in which the contact-member 9 is out of engagement with the contact-members 8, so that the main circuit is open. The armature is provided with a winding 10, however, and when this winding and one or both of the coils on the field-magnet are energized, the armature tends to rock in a direction to close the main circuit.

It is a well known characteristic of an electric relay or instrument of the type just briefly described that the torque of the armature is substantially constant throughout the small range of movement necessary for the movements of the contact-members, so that if the spring 12 be assumed to be long enough so that its tension is not substantially changed by the movement of the armature, the current required to move the armature from open-circuit position to closed-circuit position is substantially constant throughout the range of this movement.

The coil 13 of the relay-winding is energized by current from the storage-battery. This current flows, from the main conductor 6, through a wire 18 to the starting-switch 17, and thence through a wire 16, to the coil 13. From this coil it passes, through a flexible conductor, to the winding 10 of the armature, and thence, through a wire 15 to the main conductor 4 and back to the battery. Whenever the starting-switch is closed, accordingly, the armature swings in a direction to close the main circuit and permit battery-current to flow to the dynamo, so that the dynamo acts as a motor and starts the engine. When the starting-switch is open and the engine is running the dynamo generates current, which flows, from the generator, through the main conductor 5 and through the coil 14 of the field-magnet of the relay, and thence, through the armature-winding 10 and the wire 15, to the main conductor 4 and back to the dynamo. The winding 14 is of comparatively high resistance, so that the flow of current through it is small, but owing to the large number of turns in this coil the ampere-turns are sufficient to overcome the spring 12 and cause the main circuit to be closed whenever the E. M. F. generated reaches a certain predetermined amount substantially greater than the fully-charged E. M. F. of the battery, and held closed, so that the generator may charge the battery. Whenever the E. M. F. of the generator falls below this predetermined amount the spring 12 opens the relay-contacts and prevents current from flowing back from the battery. The E. M. F. at which this occurs may be readily determined by suitably proportioning the winding 14 and adjusting the strength of the spring 12. The coil 13 may be of substantially lower resistance than the coil 14, as it is energized only for short intervals, and accordingly, the flow of current through the coil 13 is sufficient to overcome the spring 12 although the E. M. F. of the battery, under which the current flows, is less than the predetermined E. M. F. essential to hold the armature in closed-circuit position when the generator is recharging the battery.

We claim:—

1. In combination with an electric motor-generator and a storage-battery, and conductors connecting them in a main circuit; a relay comprising contact-members controlling said circuit and biased to open-circuit position, and a magnet controlling the contact-members and provided with a winding divided into two independent coils; connections, between one of said coils and the main circuit, for energizing the magnet by current from the motor-generator when it is acting as a generator; connections, between the other coil and the main circuit, for energizing the relay-magnet by current from the battery when the motor-generator is to be used as a motor; and a switch for controlling the last-mentioned connections.

2. In combination with a dynamo and a storage-battery, and conductors connecting them in a main circuit; a relay comprising contact-members controlling said circuit and biased to open-circuit position, and a magnet controlling the contact-members and provided with a winding divided into two independent coils of relatively high and low resistances; connections, between the high-resistance coil and the main circuit, for energizing the magnet by current from the dynamo when it is acting as a generator; connections, between the low-resistance coil and the main circuit, for energizing the relay-magnet by current from the battery when the dynamo is to be used as a motor; and a switch for controlling last-mentioned connections.

3. In combination with a dynamo and a storage-battery, and conductors connecting them in a main circuit; a constant-torque relay biased to open-circuit position and provided with contact-members controlling the main circuit and with a magnet-winding divided into two independent coils; connections, between one of said coils and the main circuit, for energizing the magnet by current from the dynamo when it is acting as a generator; connections, between the other coil and the main circuit, for energizing the relay-magnet by current from the battery when the dynamo is to be used as a motor; and a switch for controlling the last-mentioned connections.

4. In combination with a dynamo and a storage-battery, and conductors connecting them in a main circuit; a relay comprising contact-members controlling the main circuit and a magnet controlling the contact-members; a high-resistance connection across the main-circuit conductors, between the generator and the relay-contacts, including a winding on said magnet, for energizing the magnet by current from the dynamo when it is acting as a generator; a low-resistance connection across the main conductors, between the battery and the relay-contacts, including a switch and a second winding on said magnet, for energizing the magnet by current from the battery; and means for biasing the relay to open-circuit position with a strength requiring a generated E. M. F. substantially greater than the maximum E. M. F. of the battery to cause the relay to move to closed-circuit position in response to generator-current.

EDWARD A. HALBLEIB.
FARNUM F. DORSEY.

Copies of this patent may be obtained for five cents each, by addressing the "Commissioner of Patents, Washington, D. C."